United States Patent [19]
Wilson

[11] Patent Number: 4,810,204
[45] Date of Patent: Mar. 7, 1989

[54] BATTERY PACK CONNECTION

[75] Inventor: Anton Wilson, Shelton, Conn.

[73] Assignee: Anton/Bauer, Inc., Shelton, Conn.

[21] Appl. No.: 68,350

[22] Filed: Jul. 1, 1987

Related U.S. Application Data

[63] Continuation-in-part of Ser. No. 31,104, Mar. 26, 1987, abandoned.

[51] Int. Cl.$^4$ ............................................. H01R 13/639
[52] U.S. Cl. ..................................................... 439/343
[58] Field of Search ............... 439/342, 343, 345, 350, 439/352, 246, 247, 248, 536, 553, 824, 825

[56] References Cited

U.S. PATENT DOCUMENTS

| | | | |
|---|---|---|---|
| 2,724,096 | 11/1955 | Klostermann | 439/824 |
| 3,713,076 | 1/1973 | Gabrielian et al. | 439/352 |
| 3,954,318 | 5/1976 | Larson et al. | 439/248 |
| 4,050,762 | 9/1977 | Hines et al. | 439/824 |
| 4,218,107 | 8/1980 | Wilson | 439/342 |
| 4,451,106 | 5/1984 | Wiseheart et al. | 439/536 |
| 4,550,968 | 11/1985 | Corrigan | 439/345 |

OTHER PUBLICATIONS

"Ucinite Miniature Banana Pin" Advertisement, Apr. 1954, Electronics, p. 46.

Primary Examiner—Joseph H. McGlynn
Attorney, Agent, or Firm—Kramer, Brufsky & Cifelli

[57] ABSTRACT

A battery pack connection consists of a substantially flat male plate having a plurality of spaced headed projections and female electrical terminals carried within a projecting housing and a substantially flat female plate having a plurality of keyholes designed to facilitate receiving the projections and male electrical terminals positioned within a recess for engagement with the female electrical terminals. At least one rotatable member is mounted on the female plate and has a pin that engages over the head of a corresponding projection to enable locking of the plates in both their electrical and mechanical connected relationship. Upon rotation of the member, the pin is moved out of engagement with the projection to enable uncoupling of the plates. A safety latch can be activated to abut the rotatable member when the plates are locked together to preclude inadvertent decoupling.

18 Claims, 4 Drawing Sheets

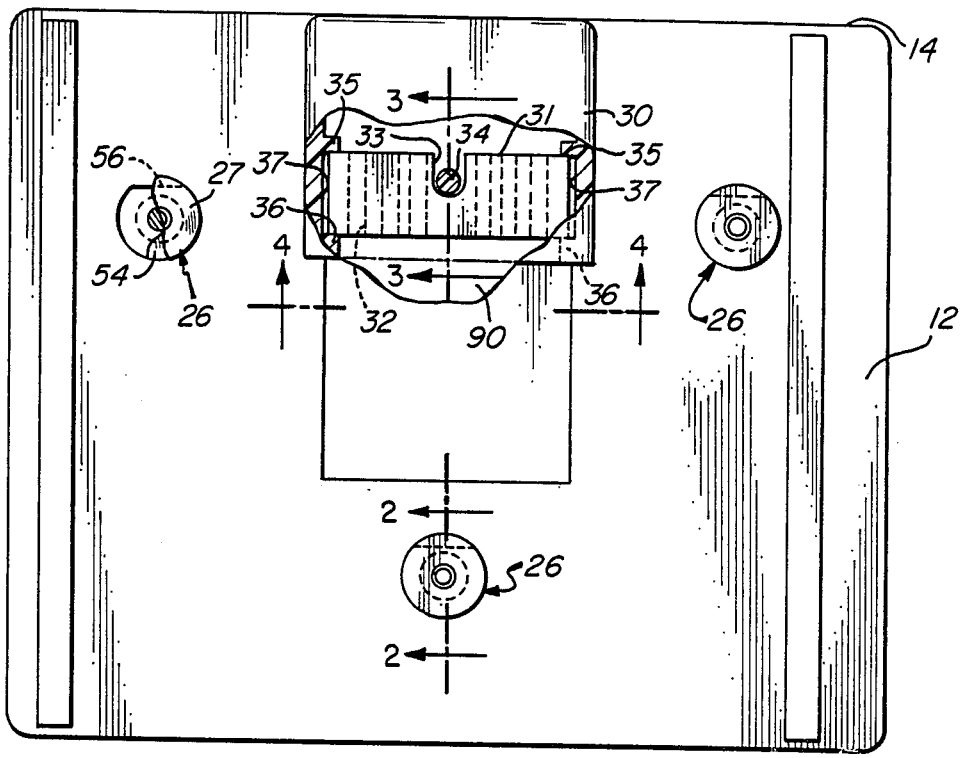
FIG. 1
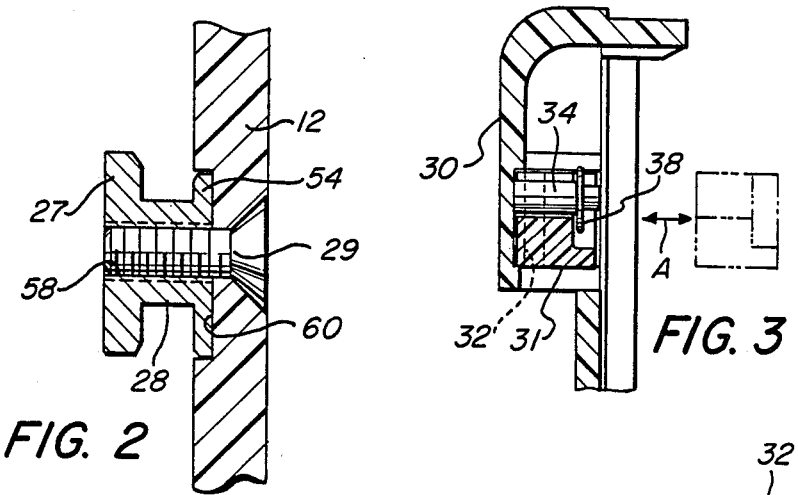
FIG. 2
FIG. 3
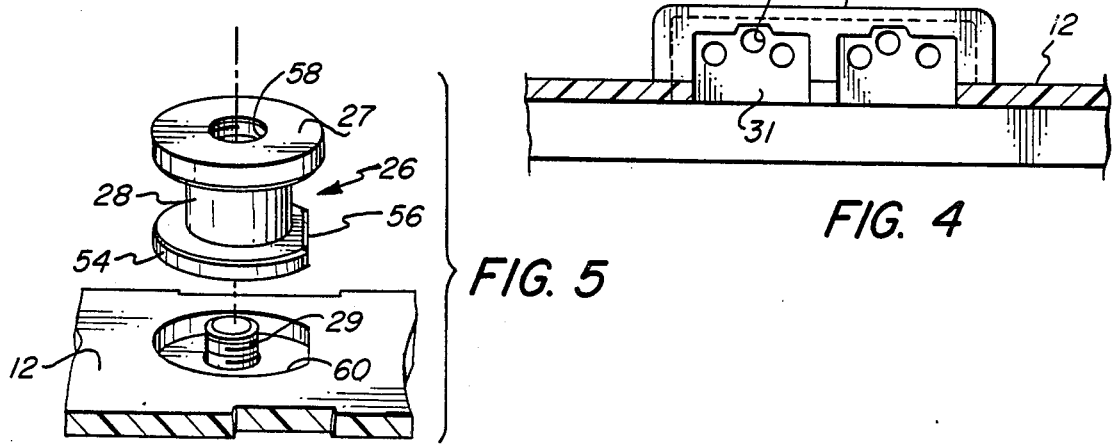
FIG. 4
FIG. 5

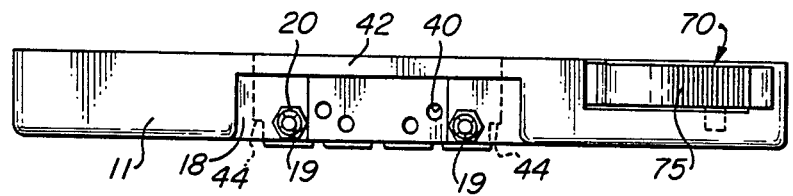
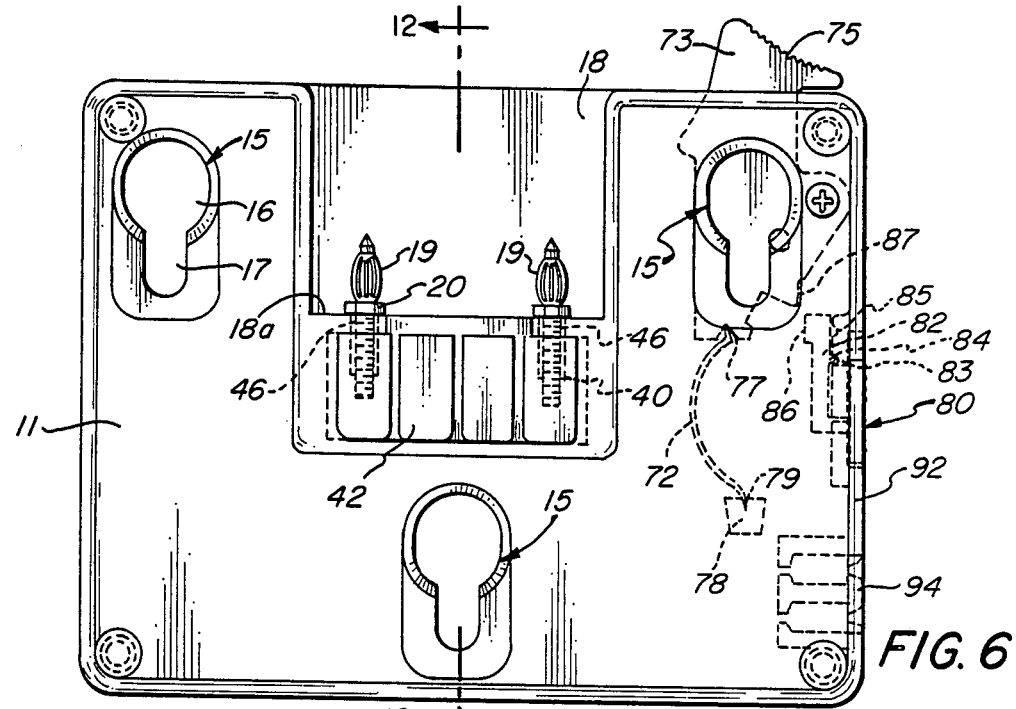
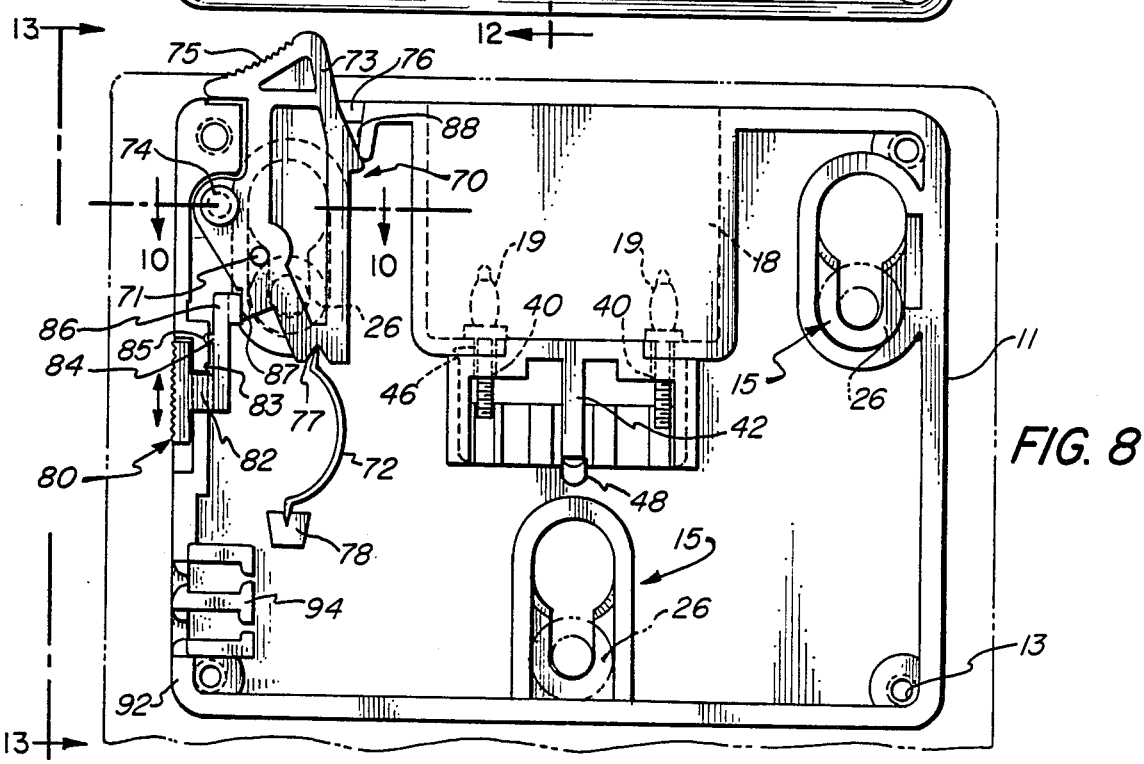

BATTERY PACK CONNECTION

CROSS REFERENCE TO RELATED APPLICATION

This application is a continuation-in-part application of U.S. Ser. No. 31,104, filed Mar. 26, 1987, now abandoned.

BACKGROUND OF THE INVENTION

1. Field of the Invention

This invention relates to a battery pack connection, and more particularly, a battery pack connection in which a battery pack can be quickly and efficiently replaced upon discharge of the batteries.

2. Description of Prior Art

The present invention has particular utility when used with electrical devices that are portable and which derive their power from batteries that are contained within a pack and which are generally connected by a cable to the device. Typically, the power supplied by the battery pack is utilized quite rapidly requiring frequent replacement of a discharged battery pack by a freshly charged pack. The replacement of a pack has generally required both an operation which effects disconnecting of the electrical connection between the pack and the device and also another operation which separates the pack from its supporting structure so that not only was replacement somewhat time consuming and requiring the user's undivided attention, but also it was susceptible to improper securement and connection.

Therefore, in U.S. Pat. No. 4,218,107, assigned to the same assignee as the present invention, a battery pack connection was disclosed which includes a female plate that is secured, as for example, directly to a portable device or may be carried by the user by being strapped to the user's body. The female plate is formed with a plurality of keyholes together with at least one male terminal with the keyholes and the terminal extending in the same direction but with the terminal being positioned within a recess spaced beneath the plane of the female plate. A male plate cooperates with the female plate and may form one side of a battery containing receptacle or pack or other similar electrical device. The male plate has a plurality of circular headed projections extending therefrom and at least one female terminal positioned within a housing that projects from the plane of the male plate.

In use, the female plate is fixed and connected to the electrical device and if the male plate is part of the battery pack, the user positions the male plate against the female plate with initial alignment occurring between the recess and the housing and with said alignment preventing lateral shifting of the plate with respect to the slots of the keyholes. The user can then only move the male plate in the direction of the keyhole slots until the headed projections enter into circular openings of the keyholes. The male plate is then further moved to position the projections within the slots of the keyholes with said movement causing electrical connection between the male and female terminals.

When the male plate has achieved its connected position, a tensioned flexible strip that is positioned behind one keyhole reverts to its normally biased position wherein it has a ledge which engages the head of the projection in said keyhole and prevents the two plates from moving from their connected position.

For removing the plate, the user merely bends the flexible strip from its normal position which unlocks the engagement between the strip and the projection to thereby permit the male plate to be moved so as to position the headed projections within the circular openings of the keyholes. At this position, the terminals have been disconnected and the male plate can be removed from the female plate in order to permit a charged battery pack to be replaced on the female plate.

The portion of the keyholes in the female plate for receiving the circular headed projections on the male plate are also all circular in shape and of a similar diameter. Thus precise horizontal and vertical alignment of all the projections simultaneously with the respective keyholes is a prerequisite for proper engagement of the two parts. This prealignment process is relatively difficult and has the undesirable effect of impeding the overall speed of engagement. This deign also requires two distinct and perpendicular motions for full engagement; insertion of the projections into the keyholes followed by a lateral motion which make electrical contact and locks the mating parts. This double motion further reduces the overall speed of engagement. Also, in order to remove the male plate from the female plate so as to readily replace the battery pack, it was necessary to hold the flexible strip in its bent position with one hand while removing the male plate with the other, which is somewhat awkward. In addition to requiring two hands, disengagement was further complicated by the requirement of two distinct motions; a lateral movement to electrically disconnect followed by a retraction in a direction perpendicular to the first.

These problems were addressed and rectified in the improved battery pack connection disclosed in U.S. Pat. No. 4,550,968, also assigned to the same assignee as the present invention. The top of each keyhole slot on the female plate, rather than being closed and/or circular, is rectangular and elongated in the direction of the slot. Where possible, for example, in those slots adjacent the top or side edge, the slots open into the edge enabling the corresponding headed projections on the male plate to be quickly located in the slots. The remaining interior slot or slots are provided with an inclined ramp to guide a mating headed projection on the male plate quickly into locking engagement with the bottom of the slot and as a consequence causes the remaining headed projections to seek their locked positions. Thus, alignment prior to engagement is significantly easier requiring positioning of only one projection instead of a plurality and in one plane instead of two. Engagement is further expedited by a one motion process instead of two.

The flexible locking strip was also provided with a latch actuator having a cam for contact with the flexible strip so that the flexible strip can be moved away from its normally biased position enabling the headed projections to be removed from the keyhole slot. In this position, the latch actuator cam projects into the keyhole slot in front of the flexible strip wherein upward movement of the male plate and headed projection will return the latch actuator to a position out of contact with the flexible strip, permitting the same to be resiliently bowed to clamp a headed projection when placed in the keyhole slot. Movement of the latch actuator from this position towards the strip causes the cam to raise the strip and remain in a raised position, wherein the male plate can be removed from the keyhole slots with the same hand. Alternatively, in the event the latch actuator has not been returned to a position out of contact with the flexible strip, the latch actuator is provided with a second cam having a camming surface which will contact a downwardly moving headed projection inserted in the keyhole slot to move the latch actuator to its first position out of contact with the flexible strip. Once again, mating relation of the plates can be accomplished with one hand. This convenience is further enhanced by a one motion removal rather than the previous two motion and direction removal process.

While the foregoing generally proved satisfactory in use, the present invention is direction to further improving several features of the battery pack connection.

First, inadvertent contact with the latch actuator could cause it to move towards the flexible locking strip to cam the strip to a held raised position, enabling the male plate to be unintentionally dislodged from the female plate. In order to prevent this from occurring, the locking mechanism should be provided with a positive return to its closed position, once opened, as a safety feature, even if two hands are required to remove the male plate from the female plate, although the subsequent function o being able to insert the male plate into the female plate so as to replace the battery pack with one hand is retained. A safety latch can also be provided to retain the locking mechanism in its closed position.

Bi-directional insertion and removal of the male plate with respect to the female plate has also been found to be more desirable to assure proper mating of the male and female contact terminals and to preclude inadvertent disassociation of the male plate from the female plate upon accidental opening of the locking mechanism. This is accomplished by returning to the use of keyhole slots receiving the headed projections on the male plate, but designing the slots so that the headed projections are more easily aligned with the corresponding slots in the female plate, thereby retaining quickness and ease of assembly and disassembly.

Finally, means are provided to assure proper alignment and entry of the male contact terminals into the female contact terminals upon assembly of the male and female plates along with improved securement means for the headed projections on the surface of the male plate to prevent loss thereof.

SUMMARY OF THE INVENTION

In accordance with the present invention, the flexible locking strip is replaced by a positive, thumb-actuated pivoted locking mechanism having a locking pin adapted to be positioned over one of the headed projections on the male plate after it is seated in the slot portion of a corresponding keyhole slot in the female plate. Upon pivoting of the mechanism with one hand, the pin can be removed from the path of movement of the head in the keyhole slot against the bias of an almost overcenter leaf spring or coil spring having rotatable end portions which provide a tactile feel upon opening and pivoting of the locking mechanism immediately conveying the position of the locking mechanism to the user that there is an unobstructed path of movement or clear keyhole slot. With the other hand, the entire male plate and headed projections can be moved up and out of corresponding closed keyhole slots, breaking the electrical connection between the terminal contacts on the male and female plates, and permitting the male plate and its batteries to be replaced by reversing the procedure, repivoting and seating the locking pin over one of the headed projections, by releasing the mechanism which is repositioned upon release by the return force of the leaf or coil spring.

If the locking mechanism is in a closed position prior to insertion of a new male plate and battery pack, the insertion of the headed projection will contact the locking pin as it is slid downwardly in the keyhole portion of the keyhole slot, causing it to cam and ride around the periphery of the headed projection to an almost fully open position against the bias of the leaf or coil spring allowing the headed projection to pass thereby. The leaf or coil spring will then be able to react on the locking mechanism to repivot the same to a fully closed position wherein the locking pin overlies the headed projection. The entire insertion and locking procedure can thus be accomplished using one hand, although the removal procedure requires the use of both hands.

Additionally, the improved locking mechanism can incorporate a safety latch precluding inadvertent and accidental pivoting of the locking mechanism to an open position once the headed projection is seated in the bottom of a keyhole slot. The latch includes a thumb-actuated slide on the side wall of the female plate which can be moved and held in a first and second position by the engagement of a detent in one of two alternative dimples on an interior wall. In the first position, the locking mechanism is free to pivot. In the second position, corresponding to the fully closed position of the latching mechanism, the latch has a strike abutted with a shoulder on the locking mechanism, preventing pivotal movement of the locking mechanism.

Besides the improved locking mechanism and safety latch, the keyhole slot, rather than being open at its top or having a circular entry opening, has an enlarged ovoid or eliptically-shaped opening, permitting easy entry and downward movement, as well as reverse movement for removal, without precise alignment of the headed projections with circular portions of a keyhole slot before entry and removal could be accomplished. The headed projections on the male plate have a half-moon shaped back plate seated in a complementally shaped slot on the wall of the male plate to preclude inadvertent turning and loosening of the screwthreaded mounting of the headed projection with concommitant loss of the projection from the plate if its mounting completely comes apart.

Finally, instead of molding the female and male plates completely in one piece including support structure for the female and male contact terminals, respectively, on each plate, the terminals are provided on removable and adjustable terminal blocks.

The female terminal block is adapted to be slide into the male plate with a U-shaped opening surrounding a stationary post. The upper and lower edges of the block are confined between upper and lower support shoulders forming a groove, which allows the connector block a specified amount of movement in all directions on a horizontal plane. This arrangement also permits preassembly of the contacts in the block and their attachment to wire connection with the battery associated with the male plate, exterior to the male plate, and once the block is slid into place on the male plate and the plate connected in turn to the female plate, the female contact terminals accepting the male contact terminals will self-align and make appropriate contact. This removes the necessity of precisely molding the contact placements in both the male and female plates.

Similarly, the male terminal block in the female plate can be separated from the female plate and slid onto the plate from the rear, riding over a cantilevered spring finger which snaps back positioning a shoulder behind the bottom edge of the block to hold it in place. Shoulders on the interior of the female plate limit inward sliding movement of the block. The male terminal contact pins can then be used to threadedly secure and lock the block against movement to the interior of the plate. As with the female connector block, the removability of the block allows assembly of electrical wiring from the device power is to be supplied to, exteriorly of the female plate.

BRIEF DESCRIPTION OF THE DRAWINGS

Further objects and advantages of the invention will become apparent from the following description and claims, and from the accompanying drawings, wherein:

FIG. 1 is a front view in elevation of the male plate of the battery pack connection of the present invention, with portions broken away and shown in section to illustrate more clearly certain features of the plate;

FIG. 2 is a cross-sectional view taken substantially along the plane indicated by line 2—2 of FIG. 1 and illustrates the manner in which the headed projections are secured to the male plate;

FIG. 3 is a cross-sectional view taken substantially along the plane indicated by line 3—3 of FIG. 1 and illustrates the connection and support of the female contact terminal block in the interior of the male plate;

FIG. 4 is a cross-sectional view taken substantially along the plane indicated by line 4—4 of FIG. 1;

FIG. 5 is an exploded perspective view of the headed projection of the battery pack connection of the present invention and further illustrates its manner of securement to the male plate of the battery pack connection.

FIG. 6 is a front view in elevation of the female plate of the battery pack connection of the present invention;

FIG. 7 is a top plan view of the female plate of FIG. 6;

FIG. 8 is a rear view in elevation of the female plate of FIG. 6 in receipt of the headed projections, shown in phantom, on the male plate with the projection locking mechanism of the battery pack connection in fully closed or locking position;

DETAILED DESCRIPTION OF THE PREFERRED EMBODIMENT

Figure 13:
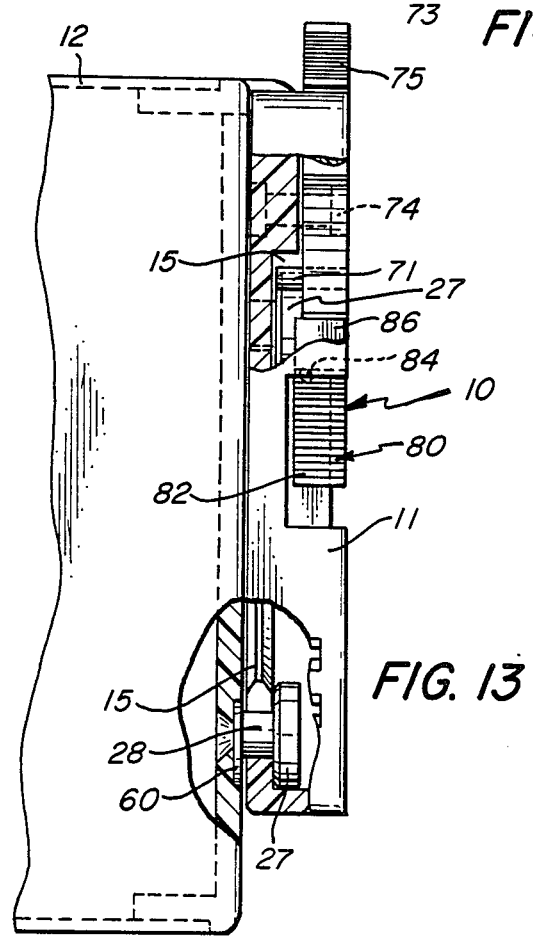
FIG. 13 is a side view in elevation of the connected plate as would be seen along the plane indicated by line 13—13 of FIG. 8, with portions of the plates removed and portions shown in section for purposes of illustrating certain components thereof.
Figures 14, 15:
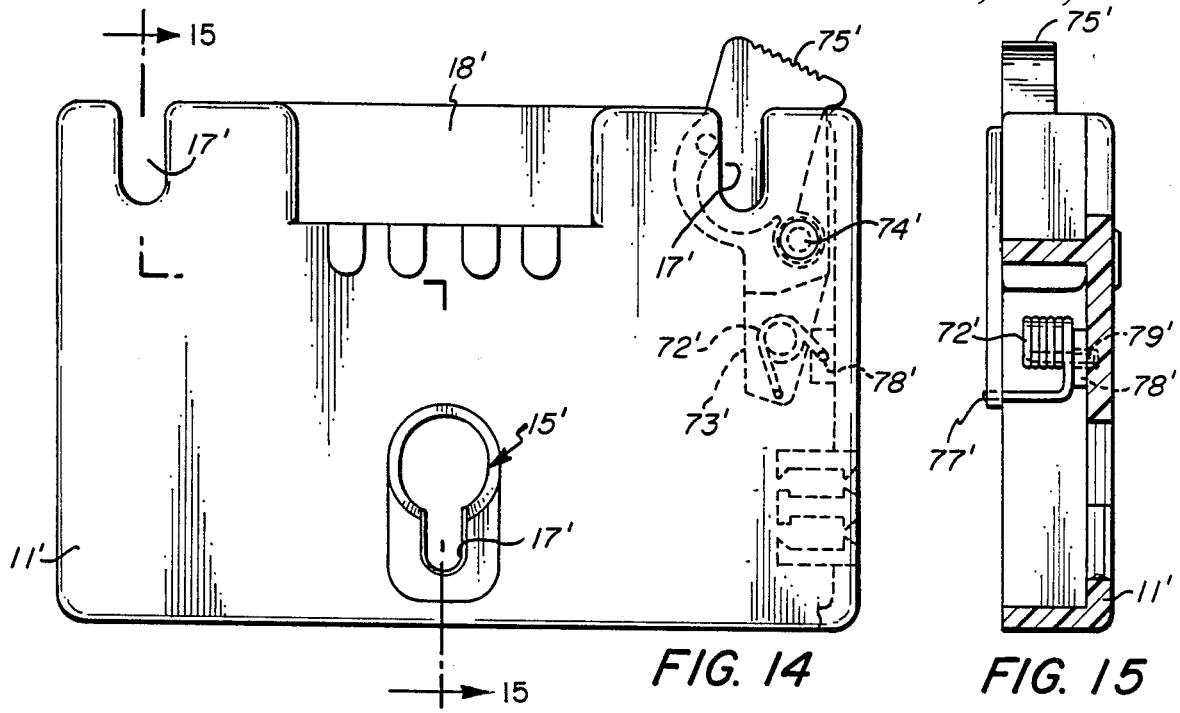
FIG. 14 is a front view in elevation of an alternative form of female plate of the battery pack connection of the present invention.
FIG. 15 is a cross-sectional view of the plate of FIG. 14 taken substantially along the plane indicated by line 15—15 of FIG. 14.

Referring now to the drawings in detail, wherein like numerals indicate like elements through the several views, the battery pack connection of the present invention is generally indicated by the reference numeral 10 in FIG. 13 and includes a female plate 11 and a male plate 12. The plate 11 has a plurality of threaded apertures 13 on its backside corners by which it may be secured to an electrical device or a support or a recharging unit (not shown) while the male plate 12 constitutes one side of a closed container 14, which contains rechargable batteries, e.g., in a recessed area 90. The container, if desired, may be secured to the male plate by fasteners extending into the peripheral edges of the plate. It will be understood that, if desired, the two plates may be reversely connected to the device and batteries.

The female plate 11 is formed with a plurality of keyholes 15 cut in its front surface, each having an elongated ovoid or elliptical opening 16 and a narrow depending slot 17. The keyholes 15 include two upper slots and a centrally located lower slot disposed in a substantially triangular array.

Formed between the two upper keyholes 15 is an open top recess 18 in which two male terminals 19 are secured, though if desired, a different number may be employed. The terminals 19, having expandable tips and a threaded shank, as shown, are positioned at the bottom wall 18a of the recess and secured thereto by passing through holes 46 in the bottom wall 18a of recess 18 formed therein into threaded engagement in holes 40 in a male contact connector block 42 slid into engagement with shoulders 44 from the rear of the female plate. The threaded shank of terminals 19 holds the connector block 42 to the bottom wall 18a of the recess 18. The threaded shank portions of terminals 19 can be used to engage metal inserts (not shown) which enable wires to be secured thereto on the rear side of the female plate 11 to effect electrical connection to the terminals. By positioning the terminals within the recess, they accordingly are located beneath the face of the front of the female plate and hence less subject to abuse during the substitution of one battery pack for another or when exposed. By providing a separable connector block 42, the wires can be connected first to the respective inserts of block 42 as a subassembly and then attached to the shank portions of terminals 19, after block 42 is inserted into female plate 11. This provides for ease of assembly and precludes the wires from floating about where they may be subject to disconnection.

The male connector block 42 is slid onto the female plate 11 from the rear, riding over a cantilevered spring finger 48 which springs back up positioning a shoulder 50 behind the bottom edge 52 of the block 42 to hold it in place.

The male plate 12 is formed with a plurality of projections 26, each of which has a large circular head 27 and an integral narrow leg portion 28 terminating in a circular end portion 54 which is cut linearly along a top edge 56 to provide a substantial half-moon shape. Each projection 26 may be secured to the male plate 12 by being formed with an axial threaded hole 58 into which a screw 29 from the backside of the male plate is threadable. The half-moon shaped end portion 54 is seated in a complementally shaped slot 60 on the front wall of the male plate 12 to preclude inadvertent turning and loosening of the threaded projection 26, with concomitant loss of the projection from the plate 12 if its mounting completely comes apart.

Extending beyond the face of the male plate is an integral housing 30 having the generally rectangular shape shown. A female contact terminal block 31 provided with a plurality of holes 32 for receiving a female electrical contact terminal (not shown) at a corresponding location to the male terminal contacts 19 on block 42 is supported in housing 30.

The female terminal block 31 is adapted to be slid into the male plate 12 from the rear of housing 30 (see FIG. 3) with a U-shaped opening 33 (see FIG. 1) surrounding a stationary post 34 molded integral with housing 30. The upper and lower edges of the block 31 are confined between upper and lower support shoulders 35,36 respectively, forming a groove. This arrangement permits pre-assembly of the female contacts in the block 31 and their attachment to wire connections with the battery associated with the male plate 12 exterior to the male plate 12, and once the block is slid into place on the male plate and the plate connected in turn to the female plate, the male terminals 19 received in the female contact terminals in holes 32 will self-align and make appropriate contact as the connector block 31 in the male plate 12 has restricted lateral movement about the stationary post 34 in a perpendicular direction between the support shoulders 35,36 as a small space 37 is provided between the side walls of the housing and the lateral edges of block 31. Slight back and forth movement in the direction of arrow A in FIG. 3 is also contemplated, as a lock washer received over post 34 and located by an undercut or groove in post 34, or a pin 38 received in frictional engagement in a small bore in the rear of post 34, to prevent removal of block 31 from housing 30, is spaced rearwardly from an undercut edge of the block. This resultant movement in a horizontal plane removes the necessity of precisely molding the contact placements in both the male and female plates as the connection will be substantially self-aligning.

A positive, thumb-actuated pivoted locking mechanism generally designated by the numeral 70 having a locking pin 71 is adapted to be positioned over one of the headed projections 27 on the male plate 12 after it is seated in the slot portion 17 of a corresponding keyhole slot 15 in the female plate 11 to lock the male and female plates together after a new battery has been substituted with a male plate. The locking mechanism 70 includes a body portion 73 pivoted about the axis of a rivet or fastener 74 attaching the body portion 73 to the rear of female plate 11. The top end of the body portion 73 forms a serrated finger pull 75 attached to body portion 73 which extends through cutout 76 in the top edge of female plate 11. Extending inwardly from the surface of body portion 73 into the rear of one of the upper keyhole slots 15 is the pin 71 (see FIGS. 8 and 10).

Figure 10:
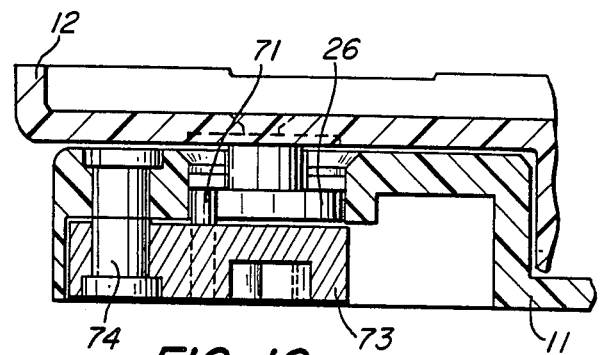
FIG. 10 is a cross-sectional view taken substantially along the plane illustrated by line 10—10 of FIG. 8.

Normally, the pin 71 projects into the rear of the keyhole slot 15 wherein upward movement of the male plate 12 and headed projection 27 in the slot 15 will contact the bottom of pin 71 as shown for example in FIGS. 8 and 10 precluding removal of headed projection 27 from slot 15 and disassociation of the plates 11 and 12.

Figure 9:
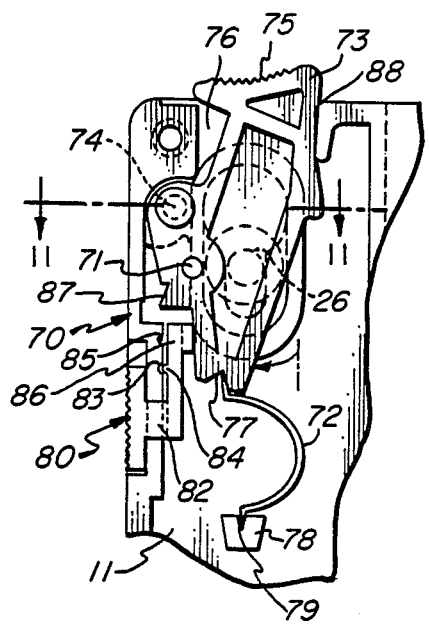
FIG. 9 is a view of the upper left hand portion of FIGURE 8 illustrating the manner of operating the projection locking mechanism so that the projections can be removed from the female plate.
Figure 11:
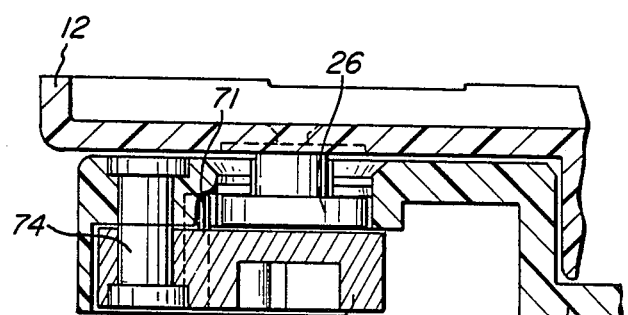
FIG. 11 is a cross-sectional view taken substantially along the plane indicated by line 11—11 of FIG. 9.
Figure 12:
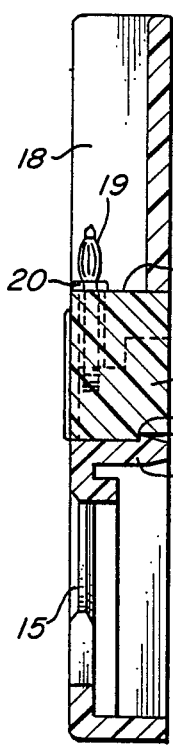
FIG. 12 is a cross-sectional view taken substantially along the plane indicated by line 12—12 of FIG. 6.

Upon pivoting of the mechanism 70 in a clockwise direction with one hand, as shown for example in FIGS. 9 and 11, until the body portion 73 strikes a surface 88 adjacent opening 76, the pin 71 can be removed from the path of movement of the headed projection 26 in the keyhole slot 15 against the bias of an almost over-center leaf spring 72, supported between a V-notch 77 on the bottom of body portion 73 and a V-notch 79 in a block 78 on the rear wall of plate 11. The use of a leaf spring 72 will provide a tactile feel to the user upon opening of the locking mechanism, signaling to the user that the locking mechanism 70 has been moved to an open condition. With the other hand, the entire male plate 12 and headed projections 27 can be moved up and then laterally out of their corresponding keyhole slots 15, breaking the electrical connection between the terminal contacts on the male and female plates, and permitting the male plate and its batteries to be replaced by reversing the procedure, seating the locking pin 71 over one of the headed projections by releasing the body portion 73, enabling the bent leaf spring 72 to rerotate the body portion 73 in a counterclockwise direction as shown in FIG. 9 to the position shown in FIG. 8.

If the locking mechanism 70 is in the closed position as shown in FIG. 8 prior to insertion of a new male plate 12 and battery pack, the insertion of the headed projection 27 will contact the locking pin 71 as it is slid downwardly in the keyhole portion 17 of the keyhole slot 15, causing it to cam and ride around the periphery of the headed projection 27 to an almost fully open position allowing the headed projection 27 to pass thereby. The leaf spring 72 will then be able to act on the locking mechanism body portion 73 to repivot the same to a fully closed position wherein the locking pin 71 overlies the headed projection 27. The entire insertion and locking procedure can thus be accomplished using one hand.

Additionally, the locking mechanism can incorporate a safety latch 80 precluding inadvertent and accidental pivoting of the locking mechanism body portion 73 to an open position once the headed projection 27 is seated in the bottom of a keyhole slot 15. The latch 80 includes a knurled thumb-actuated slide 82 on the side wall of the female plate which can be pushed inwardly and moved up and down and held in a first and second position by the engagement of a detent 84 in one of two alternative dimples 83,85 on an interior wall of female plate 11. In the first position (FIG. 9, detent 84 in dimple 83), the locking mechanism 70 is free to pivot. In the second position, corresponding to the fully closed position of the latching mechanism (FIG. 8, detent 84 in dimple 85), the latch 80 has a strike 86 on slide 82 abutted with a laterally extending shoulder 87 on the latching mechanism body portion 73, preventing pivotal movement of the locking mechanism about rivet 74.

In use, assuming the male plate 12 is part of the battery pack container and the female plate 11 is secured to the electrical device or to a supporting structure carried by the user, the user positions the male plate against the female plate and shifts the male plate until the heads 27 of the projections 26 extend into and beyond the larger expanded openings 16 of the keyholes. Because the keyhole opening 16 is an enlarged ovoid or elliptically-shaped opening, easy entry and downward movement, as well as reverse movement for removal, without precise alignment of the headed projections with the ovoid portions of the keyhole slot before entry and removal can be accomplished. Entry of projection 27 in the upper right hand slot 15 in FIG. 6 will either be obstruction free so the head 27 can enter the straight portion 17 of the slot 15 or it will strike pin 71 camming it out of the path of movement and rotating the body portion 73 of locking mechanism in a clockwise direction as viewed in FIG. 9. Leaf spring 72 will exert a force on body portion to repivot the body portion about rivet 74 in a counterclockwise direction so that pin 71 overlies the head 27 as shown in FIG. 8 preventing the plates 11 and 12 from being moved apart. Safety latch 80 can then be activated by moving slide 82 upwardly until detent 84 enters dimple 85 and strike 86 abuts shoulder 87 precluding accidental rotation of body portion 73 of locking mechanism 70. Moreover, this positions the female terminals in holes 32 of the terminal block 31 in the male plate 12 in alignment with the male terminals 19 of the connector block in the female plate 11. When the user relatively moves the two plates to cause the projections 26 to extend into the slots 17 of the keyholes, this also causes the male terminals to enter into the female terminals and the housing 30 to enter recess 18. Because of the floating nature of female terminal connector block 31, there will be substantially automatic alignment with the male terminals 19.

To remove the battery pack, the user moves the knurled top 75 of body portion 73, after moving slide 82 downwardly if it had been previously moved to the upward position, so as to rotate it in a clockwise direction as viewed in FIG. 9, until it strikes sidewall 88 of opening 76. This will move pin 71 out of the upward path of movement of headed projection 26 in the upper right hand slot 15, so it along with male plate 12 can be removed and disassociated from the female plate 11. Using the other hand, the old plate 12 can be removed and a new plate 12 and battery pack can be inserted in keyhole slots 15. Upon release of top 75 of body portion 73, spring 72 will repivot the pin 71 to a closed position overlying the headed projection 26 in the upper right keyhole slot 15. If the body portion 73 has been released and returned to a closed condition prior to insertion of a new plate 12, the new plate 12 can be inserted as before, with the projection first camming the pin 71 out of the path of movement of a projection 26 and leaf spring 72 returning pin 71 to overlie the projection.

If desired, a side wall 92 of female plate 11 can be provided with an electrical receptacle 94 to receive a plug of a light. Wires can be run from the male terminals to the plug to supply power from the battery.

Figure 16:
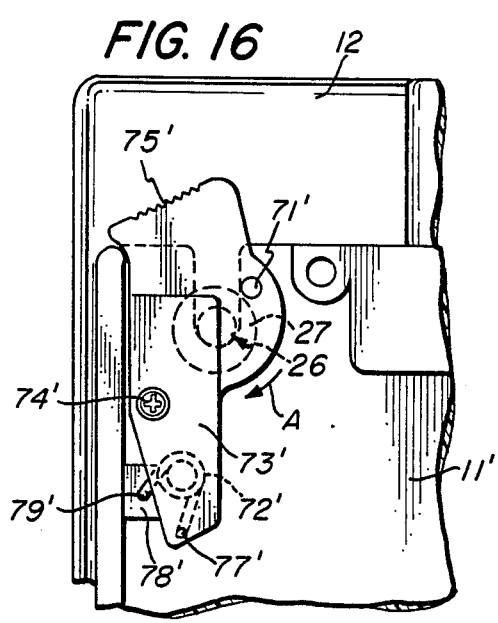
FIG. 16 is a rear view in elevation of the upper right hand portion of the female plate of FIG. 14 in locked engagement with a male plate of the type illustrated in FIG. 1.
Figure 18:
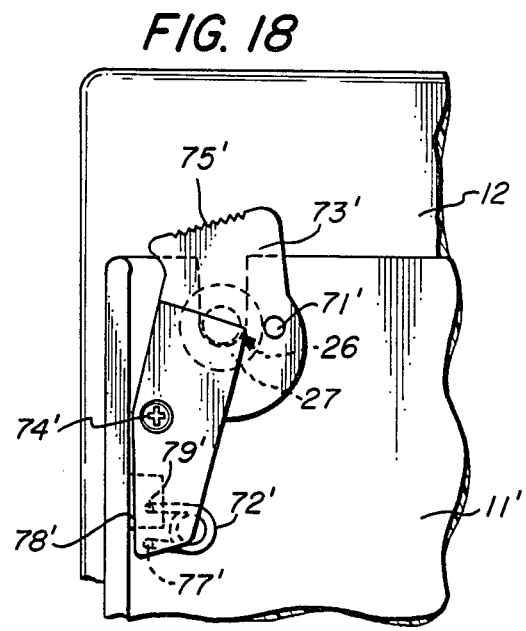
FIG. 18 is a view similar to FIG. 16, but illustrating the manner of unlocking the plates so that the headed projection on the male plate may be removed from the keyhole slots in the female plates and the plates disassociated.
Figure 17:
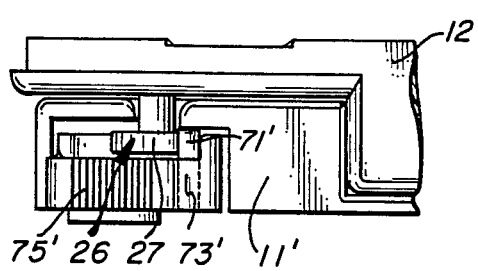
FIG. 17 is a top plan view of the locked plates of FIG. 16.

FIGS. 14 to 19 illustrate an alternative form of female plate 11' having a modified locking mechanism 70' for preventing accidental disengagement of female plate 11' from a male plate 12 containing a battery pack. Female plate 11' is shorter in height than female plate 11 (and male plate 12) and is used where space on the side of the electrical device to which plate 11' is attached is at a premium. Primed numerals indicated on the elements of plate 11' find their correspondence in functionality to the correspondingly numbered elements of plate 11. As indicated in FIGS. 16 and 18, since the height of male plate 12 is such (i.e., greater) than the female plate 11' to which it is attached, the knurled top 75' of the body portion 73' of the modified locking mechanism 70' is normally positioned below the top edge of male plate 12 when it is connected to female plate 11', thereby precluding accidental engagement of a hand with the top 75' to open the locking mechanism 70'. This removes the necessity of providing a safety latch 80 on female plates 11'.

Plate 11', being smaller in height or vertical extent than plate 11, includes only the keyhole slot portion 17' of two keyholes 15' opening in its top edge, rather than the entire keyhole 15', which as in plate 11, is provided in the lower center of female plate 11'. The recess 18 receiving the projections on plate 12 is also shortened correspondingly, but in every other respect, except for the modified locking mechanism 70', the plate 11' is identical to plate 11 and contains terminal pins 19 and connector block 42.

The locking mechanism 70' has a locking pin 71' extending from the rear surface of the body portion 73' towards the front wall of plate 11'. The pin 71' is located above a rivet 74' acting as a pivot for the body portion 73', rather than below it, as shown in connection with plate 11. This is dictated by the lack of available space between the top portion of body portion 73' and the top edge of plate 11'. Hence, the amount of movement or arc length of movement of the bottom of the body portion 73' is severely limited and insufficient to obtain adequate bowing of a leaf spring such as spring 72 to attain a tactile sense of movement of the body portion 73' to an open position and to develop sufficient force on the body portion to assure its return to a closed position. Therefore, a torsion of coil spring 72' is provided having an end 79' rotatably mounted in a lateral opening in a fixed block 78' on the interior surface of front half of plate 11'. The other end 77' of torsion spring 72' is rotatably mounted in a hole in the bottom of body portion 73' of locking mechanism 70' in parallel relation to, but lower than the end 79'.

The use of locking mechanism 70' is identical to the use of locking mechanism 70. Upon pivoting of the mechanism 70' in a clockwise direction, with one hand, as shown for example by arrow A in FIG. 16, the pin 71' can be removed from the path of movement of the headed projection 26 in the keyhole slot portion 17' of female plate 11 against the bias induced in the torsion spring 72'. Because the ends 77' and 79' freely rotate in their respective mountings, as end 77' moves in an arc relative to end 79' with the bottom of body portion 73', the entire coiled central portion of torsion spring 72' rotates rather than the end portions simply twisting, magnifying the return force and moment arm on the body portion 73' and providing a tactile feel to the user upon pivoting of the body portion 73' to its open position shown in FIGS. 18 and 19.

Figure 19:
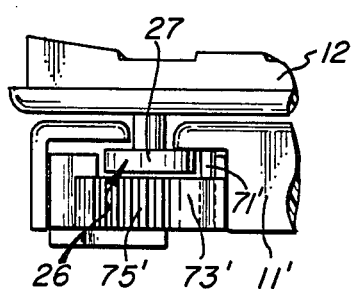
FIG. 19 is a top plan view of the unlocked plates of FIG. 18.

In the open position of locking mechanism 70', as shown in FIGS. 18 and 19, the pin 71' is out of the path of movement of headed projection 27 on male plate 12 disposed in the associated slot 17'. With the other hand, the entire male plate 12 and headed projections 27 can be moved up and then laterally with respect to keyhole 15', permitting the male plate 12 and its batteries to be replaced by reversing the procedure, seating the locking pin 71' over one of the headed projections 27. This is accomplished by releasing the body portion 73', enabling the bias induced at torsion spring 72' to rerotate the body portion 73' in a counterclockwise direction, as shown in FIGS. 18 and 19 to the position shown in FIGS. 16 and 17 with pin 71' over headed projection 27 on the new male plate 12.

If the locking mechanism 70' is in the closed position shown in FIG. 16 prior to insertion of a new male plate 12 and battery pack, the insertion of headed projection 27 will contact the locking pin 71' as it is slid downwardly in keyhole slot portion 17', causing it to cam and ride around the periphery of the headed projection 27 to an almost fully open position allowing the headed projection 27 to pass thereby. The torsion spring 72' will then act on the body portion 73' to repivot the same to a fully closed position wherein the locking pin 71' overlies the headed projection 27. The entire insertion and locking procedure can be accomplished using one hand.

While the connection of the present invention has been described specifically with application to a battery pack, it should be understood that the invention has universal application to other power or electronic control connections such as the connection of AC power supplies, power taps, micro controls, camera control equipment and the like, and the claims appended hereto should be construed to cover all such applications, variations, and modifications, all of which are deemed to fall within the scope thereof.

What is claimed is:

1. A releasable connection for a battery pack or the like comprising a relatively flat male plate and a relatively flat female plate,
   said plates being adapted to be releasably locked together in connected position;
   said female plate including a plurality of keyholes with each having an opening and a depending slot, and at least one elongated terminal, said terminal and keyhole slots being elongate in the same direction;
   said male plate including a plurality of spaced headed projections with there being one for each keyhole and with each projection having head and leg portions, and at least one elongated mating terminal;
   said male plate being positioned abutting the female plate with the leg portions of the projections being located in the slots of the associated keyholes and with the one terminal within the mating terminal;
   releasable locking means on said female plate for engaging at least one of the headed projections in at least one of said keyhole slots to lock said plates in connected position by preventing relative movement between said plates in the direction of said keyhole slots by maintaining the engagement of said locking means with said headed projection until said locking means is released; and
   safety latch means on said female plate for preventing movement of said releasable locking means upon engagement of said locking means with said headed projection.

2. The invention as defined in claim 1 wherein said keyhole openings include an enlarged ovoid entrance opening and said head projections are circular with a diameter less than the width and height of such ovoid openings.

3. The invention as defined in claim 1 in which the elongated terminal is a male terminal and is located in a recess in said female plate and the mating terminal is a female terminal that is located in a housing on the exterior of said male plate, said female terminal being in a connector block mounted for limited movement in a horizontal plane to aid in alignment of said male and mating female terminals when said plates are locked together.

4. The invention as defined in claim 1 in which the releasable locking means includes:
   at least one rotatable member on the backside of the female plate;
   a pin on said rotatable member between said rotatable member and the backside of said female plate; and
   means urging the rotatable member to a closed condition with said pin disposed in said at least one of said keyhole slots in the path of movement of said headed projection inserted in said slot.

5. The invention as defined in claim 4 wherein said urging means is a bowed leaf spring whose ends are disposed between the bottom of said rotatable member and a fixed support on the backside of said female plate.

6. The invention of claim 5 wherein said safety latch means includes a slide on a side wall of said female plate having a strike adapted to be slid into abutment with said rotatable member to prevent rotation thereof.

7. The invention as defined in claim 1 wherein said headed projections are received and mounted in complementally shaped recesses in the front of said male plate, said headed projections including
   means to prevent rotation of said projection in said recess.

8. The invention of claim 7 wherein said headed projections include a leg terminating in a substantially half-moon plate received in a complementally shaped recess.

9. A releasable connection for a battery pack or the like comprising a relatively flat male plate and a relatively flat female plate,
   said plates being adapted to be releasably locked together in connected position;
   said female plate including a plurality of depending slots, and at least one elongate terminal, said terminal and slots being elongate in the same direction;
   said male plate including a plurality of spaced headed.; projections with there being one for each slot and with each projection having head and leg portions, and at least one elongated mating terminal;
   said male plate being positioned abutting the female plate with the legs of the projections being located in associated slots and with the one terminal within the mating terminal;
   releasable locking means on said female plate for engaging at least one of the headed projections in one of said slots to lock said plates in connected position by preventing relative movement between said plates in the direction of said slots by maintaining the engagement of said locking means with said headed projection until said locking means is released; and said releasable locking means includes
   at least one rotatable member on the backside of the female plate;
   a pin on said rotatable member between said member and the backside of said female plate; and
   means urging the member to a closed condition with said pin disposed in the path of movement of said headed projection inserted in said slot.

10. The invention as defined in claim 9 wherein said urging means is a bowed leaf spring whose ends are disposed between the bottom of said rotatable member and a fixed support on the backside of said female plate.

11. The invention as defined in claim 9 wherein said urging means is a torsion spring disposed between the bottom of said rotatable member and a fixed support on the backside of said female plate.

12. The invention as defined in claim 11 wherein the ends of said torsion spring are freely rotatable in their mounting on said rotatable member and fixed support.

13. The invention as defined in claim 11 wherein the ends of said torsion spring are arranged in parallel relation, one above the other.

14. The invention as defined in claim 13 wherein the ends of said torsion spring are freely rotatable in their mounting on said rotatable member and fixed support.

15. A releasable connection for a battery pack or the like comprising a relatively flat male plate and a relatively flat female plate, said plates being adapted to be releasably locked together in connected position;

said female plate including a plurality of keyholes with each having an opening and a depending slot, and at least one elongated terminal, said terminal and keyhole slots being elongate in the same direction;

said male plate including a plurality of spaced headed projections with there being one for each keyhole and with each projection having head and leg portions, and at least one elongate mating terminal;

said male plate being positioned abutting the female plate with the leg portions of the projections being located in the slots of the associated keyholes and with the one terminal within the mating terminal;

releasable locking means on said female plate for engaging at least one of the headed projections in at least one of said keyhole slots to lock said plates in connected position by preventing relative movement between said plates in the direction of said keyhole slots by maintaining the engagement of said locking means with said headed projection until said locking means is released; and the elongated terminal being a male terminal and located in a recess in said female plate and the mating terminal being a female terminal that is located in a housing on the exterior of said male plate, said housing on said male plate having a stationary post integral therewith;

said female terminal being in a connector block mounted for limited movement in a horizontal plane to aid in alignment of said male and mating female terminals when said plates are locked together, said connector block having an opening receiving said stationary post for restricting movement of said female terminal; and means associated with said stationary post to prevent removal of said connector block from said housing in said male plate.

16. A releasable connection for a battery pack or the like comprising a relatively flat male plate and a relatively flat female plate, said plates being adapted to be releasably locked together in connected position;

said female plate including a plurality of keyholes with each having an opening and a depending slot, and at least one elongated terminal, said terminal and keyhole slots being elongate in the same direction;

said male plate including a plurality of spaced headed projections with there being one for each keyhole and with each projection having head and leg portions, and at least one elongate mating terminal;

said male plate being positioned abutting the female plate with the leg portions of the projections being located in the slots of the associated keyholes and with the one terminal within the mating terminal;

the elongated terminal being a male terminal and locked in a recess in said female plate and the mating terminal being a female terminal that is located in a housing on the exterior of said male plate, said housing on said male plate having a stationary post integral therewith;

said female terminal being in a connector block mounted for limited movement in a horizontal plane to aid in alignment of said male and mating female terminals when said plates are locked together, said connector block having an opening receiving said stationary post for restricting movement of said female terminal; and means connected with said stationary post to prevent removal of said connector block from said housing in said male plate.

17. The invention as defined in claim 16 wherein said connector block is removably mounted on said male plate.

18. A releasable connection for a battery pack or the like comprising a relatively flat male plate and a relatively flat female plate, said plates being adapted to be releasably locked together in connected position;

said female plate including a plurality of keyholes with each having an opening and a depending slot, and at least one elongated terminal, said terminal and keyhole slots being elongate in the same direction;

said male plate including a plurality of spaced headed projections with there being one of each keyhole and with each projection having head and leg portions, and at least one elongated mating terminal;

said male plate being positioned abutting the female plate with the leg portions of the projections being located in the slots in the associated keyholes and with the one terminal within the mating terminal;

the elongated terminal being a male terminal and locked in a recess in said female plate and the mating terminal being a female terminal that is located in a housing on the exterior of said male plate;

said male terminal being in a removably mounted block connected to said female plate, and means to hold said block on said female plate, said holding means including a cantilievered arm integral with and extending outwardly from said surface of said female plate having an end portion adapted to abut said block.

* * * * *